May 9, 1967     G. R. CLAASSEN     3,318,672
METHOD AND APPARATUS FOR PRESS BENDING GLASS SHEETS
Filed Aug. 21, 1963     3 Sheets-Sheet 1
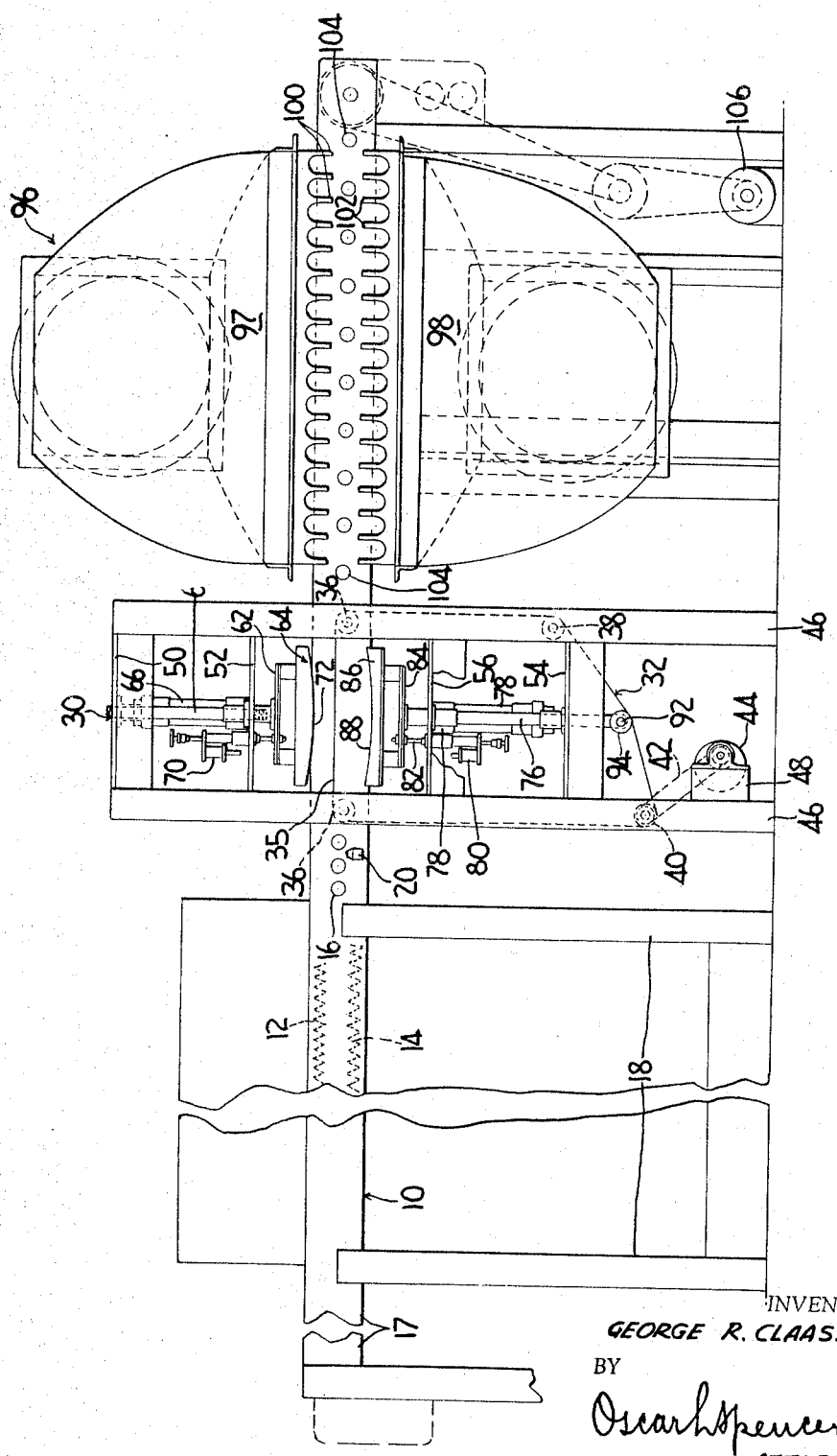
INVENTOR.
GEORGE R. CLAASSEN
BY
Oscar L. Spencer
ATTORNEY May 9, 1967   G. R. CLAASSEN   3,318,672
METHOD AND APPARATUS FOR PRESS BENDING GLASS SHEETS
Filed Aug. 21, 1963   3 Sheets-Sheet 2
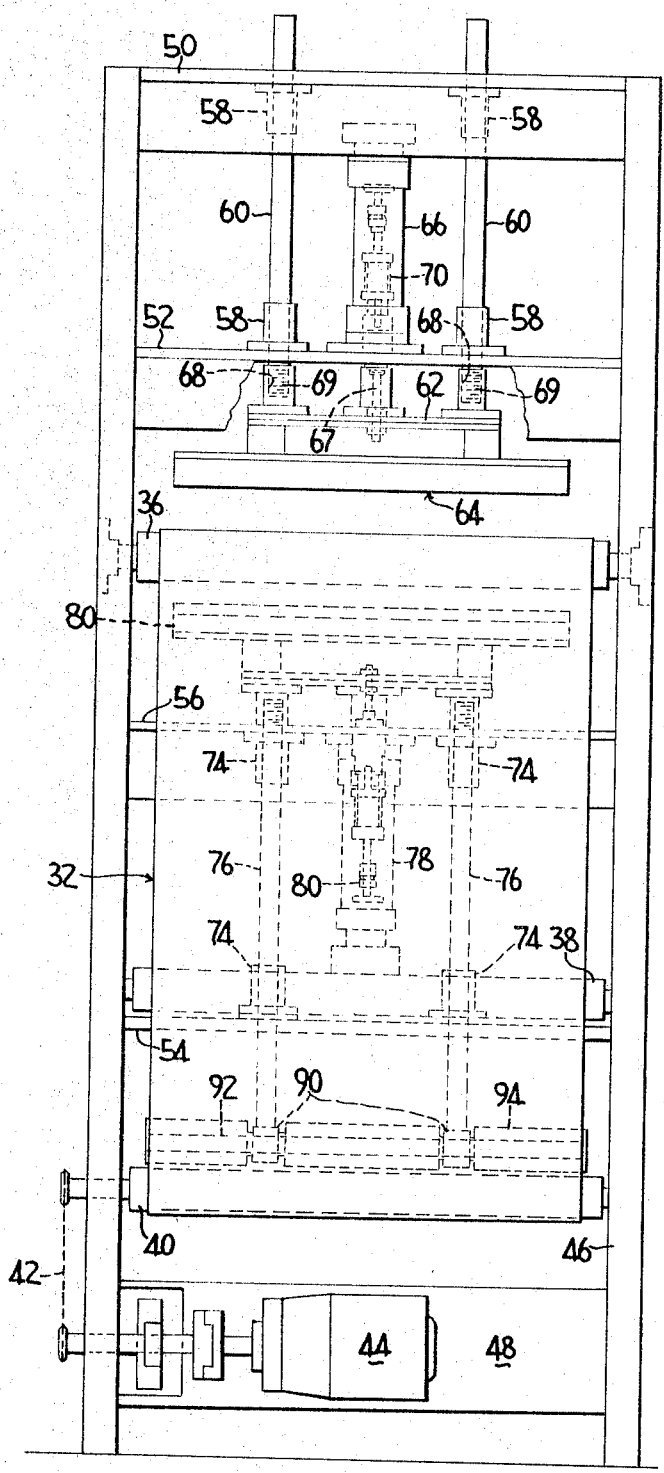
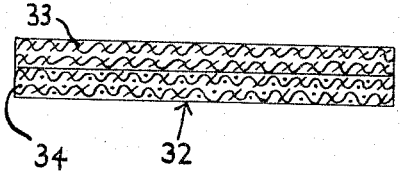
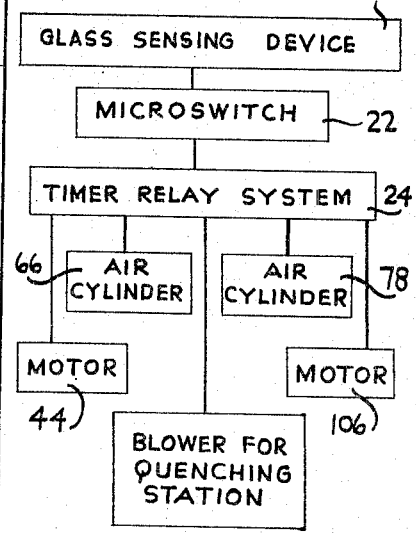
INVENTOR.
GEORGE R. CLAASSEN
BY
Oscar H. Spencer
ATTORNEY May 9, 1967  G. R. CLAASSEN  3,318,672
METHOD AND APPARATUS FOR PRESS BENDING GLASS SHEETS
Filed Aug. 21, 1963  3 Sheets-Sheet 3

INVENTOR.
GEORGE R. CLAASSEN
BY
Oscar L. Spencer
ATTORNEY

United States Patent Office 3,318,672
Patented May 9, 1967

3,318,672
METHOD AND APPARATUS FOR PRESS BENDING GLASS SHEETS
George R. Claassen, New Kensington, Pa., assignor to Pittsburgh Plate Glass Company, Pittsburgh, Pa., a corporation of Pennsylvania
Filed Aug. 21, 1963, Ser. No. 303,570
11 Claims. (Cl. 65—106)

This application relates to treating glass sheets and particularly concerns conveying horizontally supported heat-softened glass sheets and shaping them to a desired shape.

The present invention is intended to be employed between a horizontal conveyor extending through a furnace for transporting glass sheets through a hot atmosphere sufficient to raise the temperature of the glass sheets to a temperature at which they can be shaped by pressurized engagement between a pair of glass shaping members having complementary shaping surfaces conforming to the shape desired for the bent glass sheet opposing one another and an additional conveyor extending through a quenching apparatus for conveying the glass sheet through a relatively cold atmosphere where the glass is suddenly chilled.

The apparatus for shaping glass sheets according to the present invention comprises flexible means in the form of a belt conveyor extending in the space between the furnace conveyor and the quenching conveyor. The glass shaping apparatus comprises an upper glass shaping member located above a horizontal plane of support for glass sheets conveyed through the furnace, the shaping station and the quenching apparatus, a lower glass shaping member located below said plane, the glass shaping members being provided with complementary shaping surfaces conforming to the shape desired for the glass sheet after bending. The upper and lower shaping members are in facing relation to one another.

A flexible means in the form of a flexible belt capable of conforming to one of said shaping surfaces is provided having a horizontally disposed upper run for supporting a heat-softened glass sheet thereon and conveying it from the furnace conveyor into a position of alignment between the shaping members for holding the glass between the shaping members during shaping and for transferring the shaped glass sheet onto the quenching apparatus conveyor after shaping has been completed. The flexible belt has a horizontally disposed upper run extending between the upper and lower glass shaping members. The flexible belt is entrained about a plurality of rollers. One of the rollers is driven by a motor to impart motion to the flexible belt and convey the glass sheet according to the program of operation described above. According to the present invention, the flexible belt for conveying the glass into and out of bending relation with respect to the glass shaping members serves two purposes. It conveys the glass sheet from the furnace conveyor to the tempering apparatus conveyor and it serves as a parting material between the lower of the glass shaping members and a glass sheet to be shaped.

In order to serve the latter purpose, the flexible conveyor belt is composed of a material that does not mar the surface of the softened glass sheet when the latter is shaped by pressurized contact between the glass shaping members. Furthermore, it is entrained about a plurality of rollers, one of which is mounted for movement in response to movement of the lower glass shaping member. When the lower glass shaping member is moved downward, the adjustable roller is moved outward against the belt into a belt tensioning position. When the bottom glass shaping member is moved upward, the movable roller moves inward with respect to the belt to relieve the tension on the belt and to permit the upper run of the belt to conform to the complementary shaping surfaces of the glass shaping members.

Details of an illustrative embodiment of structure conforming to the present invention will be described in order to provide a better understanding of the present invention.

In the drawings which form part of the present invention,

FIG. 1 is a side elevation of an assembly showing how a typical glass shaping station according to the present invention is interposed between a furnace and a tempering apparatus;

FIG. 2 is an end elevation of the illustrated glass shaping station;

FIG. 5 is a cross-sectional view of a typical belt used with the present invention; and FIG. 6 is a schematic diagram of an automatic timer control system for the present invention.

Figure 3:
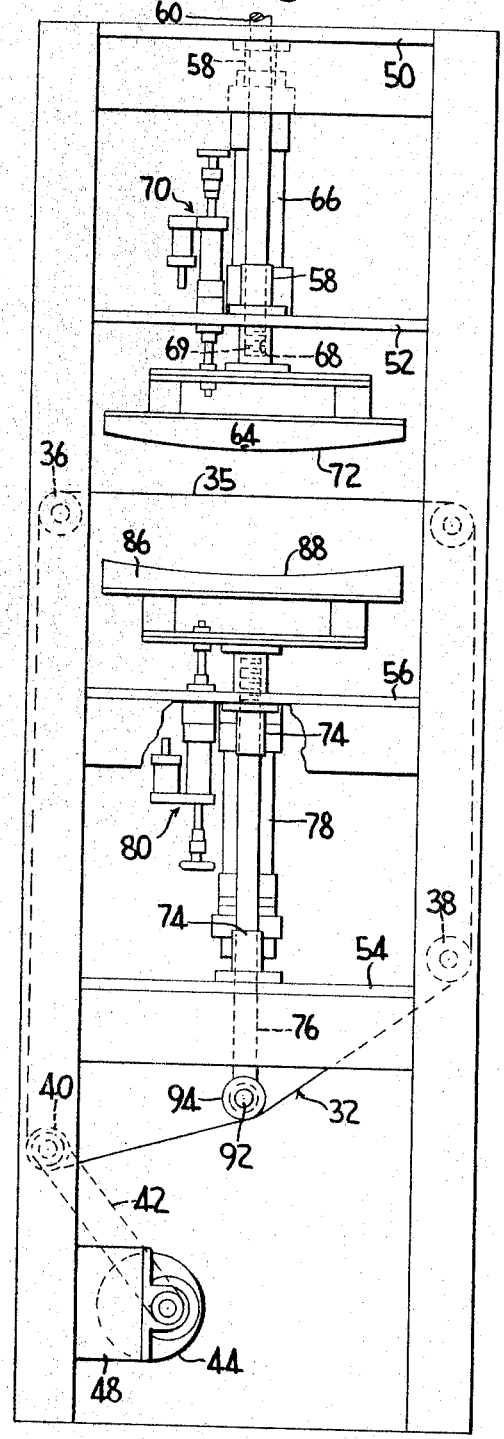
FIG. 3 and 4 are enlarged views of the glass shaping station showing the configuration of the flexible belt when the glass shaping members are retracted from one another and when they are in pressurized engagement with a glass sheet interposed between during shaping.
Figure 4:
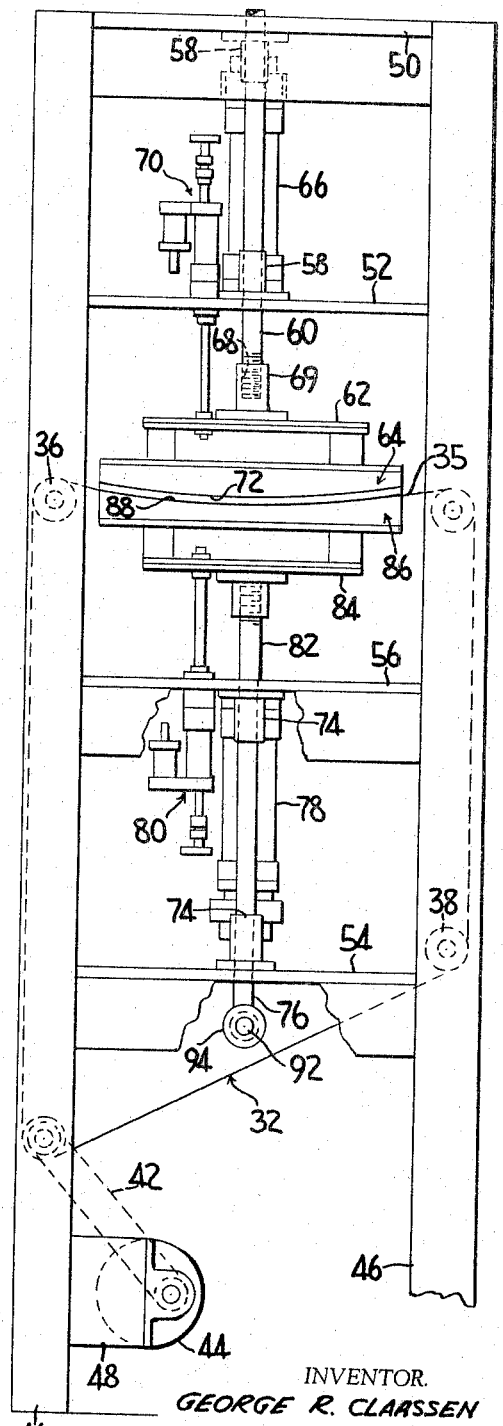

Referring to the drawings, reference number 10 refers to a tunnel-like furnace provided with upper heating elements 12 and lower heating elements 14 disposed above and below a horizontal roll conveyor 16, the rolls of which are supported on bearings mounted in a horizontal channel member 17. The furnace is supported on furnace supports 18 which are conventional in the art.

A glass sensing device 20 is located between the last two rolls of the horizontal roll conveyor 16. The glass sensing device operates a microswitch 22 when the leading edge of a glass sheet passes thereover to actuate a timer relay system 24 comprising a series of timer relays that actuate and terminate the operation of the moving apparatus that operates on the glass.

Beyond the furnace 10 is a glass shaping station 30. A unique feature of the present invention is a flexible belt 32, preferably of a material that does not mar softened glass sheets upon pressurized contact therewith, such as an outer layer of knit fiber glass 33 and an inner layer 34 of wire reinforced woven fiber glass. The knit fiber glass layer 33 that faces the glass is very flexible and does not mar the surface of the heated glass sheet. The wire reinforced layer 34 imparts rigidity to the belt to enable the latter to convey glass sheets to and from pressing position.

The belt has an upper run 35 entrained about an upper pair of rollers 36. The belt continues from its upper run downward about a lower idler roller 38 and across its lower run to a driven roller 40. The latter roller is driven by a chain drive 42 entrained about the drive pulley of a drive motor 44. Vertical support columns 46 of an open frame structure support the various rollers 36, 38, and 40 and also a bracket 48 for supporting the drive motor 44. Upper support plates 50 and 52 and lower support plates 54 and 56 interconnect opposite vertical support columns 46. The plates may be reinforced by peripheral reinforcing channels (unnumbered).

The upper apertured plates 50 and 52 each support a pair of sleeve bearing mounts 58. The sleeve bearings within the mounts 58 are aligned in vertical sets of pairs to receive a pair of vertically slidable rods 60. The latter have bottom ends secured to a backing plate 62 of an upper glass shaping member 64 by an internally threaded socket 68 threadedly engaging a lower threaded portion 69 of each rod 60. The upper apertured plate 52 also supports an air cylinder 66 having a piston rod 67 secured to the backing plate 62 of the upper glass shaping member 64. A check valve 70 is operatively connected with the air cylinder 66 in a manner well known in the art. Since the details of the solenoid valve and the check valve do not form part of the present invention, and details of such devices are well known, the details are not incorporated in the present description.

The shaping surface 72 of the upper shaping member 64 presents a convex configuration facing downward. Lower apertured plates 54 and 56 are apertured in a manner similar to the upper apertured plates 50 and 52 to receive sleeve bearing mounts 74 arranged in vertically aligned pairs to slidably receive vertically slidable rods 76. The lower aperture plate 56 supports an air cylinder 78 and its operatively connected check valve 80. A piston 82 of air cylinder 78 and vertically slidable rods 76 are connected at the upper ends to a backing plate 84 of a lower glass shaping member 86 in a manner similar to the attachments to the upper shaping member. Lower glass shaping member 86 has an upper shaping surface 88 of concave elevation that is complementary to the convex shaping surface 72 of the upper glass shaping member 64.

Air cylinders 66 and 78 are operated in response to signals from the timer relay system to solenoid valves in a manner well known in the valve art to cause the upper glass shaping member 64 and the lower glass shaping member 86 to move toward and away from one another.

The bottom of each of the vertically slidable rods 76 terminates in a sleeve 90 having a horizontal axial bore. An axle rod 92 supporting a sectionalized roller 94 extends through the sleeve 90. Sectionalized roller 94 is movable in response to movement of the lower glass shaping member 86. When the lower glass shaping member 86 is retracted, sectionalized roller 94 is moved downward into engagement with the portion of flexible belt 32 that forms the lower run between rollers 38 and 40.

In a first position roller 94 engages the flexible belt 32 to apply tension against the flexible belt when the lower glass shaping member 86 is moved away from the upper run 35 of flexible belt 32. When the lower glass shaping member 86 is moved upward toward said upper run 35 of flexible belt 32, the sectionalized roller 94 moves away from the flexible belt to relieve the tension. Thus, the upper run 35 can change from a straight line configuration as it is when the belt is tensioned by the roller 94 into an arcuate shape conforming to the upper shaping surface 88 of the lower glass shaping member 86 and the bottom glass shaping surface 72 of the upper glass shaping member 64.

A quenching station 96 is located beyond the glass shaping station 30. The quenching station comprises an upper plenum chamber 97 and a lower plenum chamber 98. The upper plenum has a bottom wall that is apertured to form elongated downwardly facing slot nozzles 100. A series of elongated upwardly facing slot nozzles 102 disposed in parallel opposing relationship to the nozzles 100 extend upward from the lower plenum 98. A conveyor 104 extends in end-to-end relation with the upper run 34 of the flexible belt 32 and beyond to an unloading station. Means for supplying air under pressure to the upper and lower plenums 97 and 98, respectively, are provided. A motor 106 provides a means for driving the rolls of the tempering quenching station conveyor rolls 104.

In operation, glass sheets are conveyed along the furnace conveyor 16 and heated by the heating elements 12 and 14 to a temperature sufficient for shaping and subsequent tempering. They are then transferred to the upper run 35 of the flexible belt 32. The latter is normally tensioned by virtue of the fact that the glass shaping members 64 and 86 are retracted from the support plane defined by the upper run 34 of the flexible belt 32. When the heat-softened glass sheet is properly aligned with the shaping members 64 and 86, the members move inward toward one another until said glass shaping members are in pressurized contact on opposite sides of the heat-softened glass sheet supported on upper run 35. The upward movement of the movable roller 94 which tensions the belt releases the tension in the belt and permits the upper run 34 to conform to the arcuate shape of the upper shaping surface 88 of the lower glass shaping member 86. As soon as the shaping is completed, the shaping members are retracted from one another, the belt is tensioned and moved to another position, and the glass sheet is moved onto the quenching conveyor 104 where the glass is transported between the upper nozzles 100 and the lower nozzles 102 to quench the glass sheets. The glass is then removed beyond the quenching station 96.

The timer relay system 24 controls the operation of the drive motor 44, the air cylinders 66 and 84, the motor 106 and a compressor for the quenching station 96 in accordance with a timed sequence.

The movement of the belt 32 between glass shaping operations to remove one bent sheet from the glass shaping station 30 and introduce the next glass sheet into position for pressing promotes long life for the belt. This long life results from the fact that the belt is indexed to expose a different portion thereof to pressurized contact between the glass shaping members 64 and 86 for many successive bending operations, perhaps thousands, before the identical area is again subjected to pressurized contact. However, if a belt becomes worn, it is a simple matter to cut the worn belt and replace it with a ribbon of the proper length and sew the ends of the ribbon together using fiber glass cloth thread.

The form of the invention shown and described in this disclosure represents an illustrative preferred embodiment thereof. It is understood that various changes may be made without departing from the spirit of the invention as defined in the claimed subject matter which follows.

What is claimed is:

1. Apparatus for shaping glass sheets comprising a flexible belt having a horizontally disposed upper run for supporting a heat-softened glass sheet thereon, a plurality of rollers about which said flexible belt is entrained, an upper glass shaping member located above said upper run and a lower glass shaping member located below said upper run, said glass shaping members having complementary shaping surfaces facing one another, said complementary shaping surfaces conforming to the shape desired for the glass sheet after bending, shaping member moving means moving said glass shaping members between a retracted position spaced from said upper run and a closed position wherein said glass shaping members are in pressurized contact on opposite sides of a heat-softened glass sheet supported on said upper run, and means connected to one of said rollers and responsive to movement of said lower glass shaping member to move outward against the belt into a belt tensioning position when said lower glass shaping member is moved downward and to move away from the belt to relieve the tension on the belt and to permit the upper run to conform to said complementary shaping surfaces when engaged in pressurized engagement between said shaping members.

2. Apparatus as in claim 1, wherein said rollers are mounted on parallel axes and the complementary shaping surfaces have an axis of curvature substantially parallel to said axes of said rollers.

3. Apparatus as in claim 1, wherein said belt has an outer surface composed of a material that does not mar the surface of a heat-softened glass sheet when the latter is shaped by pressurized contact.

4. Apparatus as in claim 1, wherein said outer surface of said belt comprises a fiber glass composition.

5. Apparatus as in claim 1, wherein said outer surface of said belt comprises knit fiber glass.

6. Apparatus for shaping glass sheets comprising a belt conveyor having an upper run, a pair of glass shaping members having complementary shaping surfaces, one located above and the other located below said upper run, shaping member moving means moving said glass shaping members relative to said upper run, a movable roller, means connecting said movable roller to said glass shaping member located below said upper run to move said movable roller in response to movement of said latter glass shaping member to cause said movable roller to tension said belt conveyor and straighten said upper run when said latter glass shaping member is moved away from said upper run and to relax said belt conveyor and enable said upper run to conform to said shaping surface of said latter glass shaping member when said latter glass shaping member is moved toward said upper run to sandwich said glass sheet between said glass shaping members when said glass is supported on said upper run between said glass shaping members.

7. Apparatus for shaping heat-softened glass sheets comprising an upper glass shaping member having a lower shaping surface of convex configuration and a lower glass shaping member having an upper shaping surface of concave configuration complementary to the shaping surface of the upper glass shaping member, a flexible belt, a plurality of rollers about which said flexible belt is entrained, said rollers comprising a pair of spaced upper rollers defining an upper run for said belt and an additional roller mounted for movement with respect to said pair of spaced upper rollers, said upper run being located between said shaping surfaces, means providing relative movement of said shaping surfaces toward and away from said upper run, and means responsive to movement of said lower glass shaping member to move said additional roller between a first position engaging said flexible belt to apply tension against said flexible belt when said lower glass shaping member is moved away from said upper run and a second position away from said flexible belt to relieve said tension when said lower glass shaping member is moved into engagement with said lower glass shaping member.

8. Apparatus for shaping and tempering glass sheets comprising a tunnel, heating elements disposed in spaced, opposed sets along the length of said tunnel to irradiate the space therebetween, first conveyor means for conveying said glass sheet through said space while irradiated by said heating elements, a belt conveyor having an upper run having a leading end aligned in end-to-end relation with said first conveyor means, said upper run forming a continuation of said first conveyor means for transporting said glass sheet therealong, a pair of glass shaping members having complementary shaping surfaces, one located above and the other located below said upper run, means to move said glass shaping members relative to said upper run, a movable roller, means connecting said movable roller to said glass shaping member located below said upper run for movement in response to movement of said glass shaping member located below said upper run to cause said movable roller to tension said belt conveyor and straighten said upper run when said latter glass shaping member is moved away from said upper run and to relax said belt conveyor and enable its said upper run to conform to said shaping surface of said latter glass shaping member when said latter glass shaping member is moved toward said upper run, second conveyor means disposed in end-to-end relation with the trailing end of said upper run and forming a continuation of said upper run, a plurality of nozzles disposed on both sides of and spaced from said second conveyor means, and means to supply tempering fluid under pressure through said plurality of nozzles onto said glass sheet as it occupies the space between said nozzles.

9. Apparatus for bending and tempering glass sheets comprising a furnace, a glass shaping station and a glass quenching station arranged in end-to-end relation, means for conveying said glass sheet through said furnace, said glass shaping station and said glass quenching station while supporting said glass sheet substantially horizontally in a substantially horizontal plane, said conveying means comprising a first conveyor extending in a horizontal plane through said furnace for conveying said glass sheet therethrough, a flexible conveyor belt having an upper run located in end-to-end relation beyond said first conveyor and extending through said glass shaping station in said horizontal plane for conveying said glass sheet into and out of position to be shaped and a second conveyor located in end-to-end relation beyond said upper run and extending through said quenching station in said horizontal plane for conveying said glass sheet therethrough, an upper glass shaping member located above said upper run and having a downwardly facing shaping surface, a lower glass shaping member located below said upper run and having an upwardly facing shaping surface complementary to said downwardly facing shaping surface, a movable roller, means connecting said movable roller to said lower glass shaping member to move between a first position engaging said conveyor belt to apply tension thereagainst when said lower glass shaping member is moved downward and a second position out of engagement with said conveyor belt to relax the latter and permit said upper run to assume the shape of said upwardly facing shaping surface when said glass sheet is shaped by pressurized engagement between said complementary shaping surfaces while supported on said flexible conveyor belt between said upper and lower glass shaping members.

10. A method of shaping a glass sheet comprising heating said glass sheet to a temperature sufficient for shaping, supporting said heat-softened glass sheet in a horizontal plane on a flexible support under tension, conveying the glass sheet while supported on said tensioned flexible support to a position between a pair of glass shaping members having complementary shaping surfaces, and relaxing the tension on said flexible support while applying pressurized contact between said glass shaping members for a time sufficient to shape the heat-softened glass sheet and said flexible support to conform to the shaping surface of said glass shaping members, disengaging said bent sheet from said pressurized contact while tensioning said flexible support, conveying said bent glass sheet from said position while supported on said tensioned flexible support, and removing said bent glass sheet from said flexible support.

11. Apparatus for shaping heat-softened glass sheets comprising a pair of glass shaping members having complementary shaping surfaces facing one another, said complementary shaping surfaces conforming to the shape desired for a glass sheet after bending, means attached to at least one of said shaping members for providing relative movement between a retracted position wherein said shaping members are spaced from one another and a closed position wherein said glass shaping members are in pressurized contact against opposite surfaces of said heat-softened glass sheet, flexible means capable of conforming to one of said shaping surfaces extending between the shaping surface of one of said shaping members and a glass sheet to be shaped to serve as a parting material therebetween, means mounted for movement in response to movement of said one of said shaping members to tension said flexible means when said one of said shaping members is retracted and to relieve the tension on said flexible means to permit the latter to conform to said one of said shaping surfaces when said one of said shaping members is in pressurized contact with one of said surfaces of said heat-softened glass sheet, and roller means for moving said flexible means across said shaping surface when said one shaping member is retracted.

References Cited by the Examiner

UNITED STATES PATENTS 3,077,753  2/1963  Dammers ‑‑‑‑‑‑‑‑‑ 65—287 X
3,144,319  8/1964  Robinson ‑‑‑‑‑‑‑‑‑‑‑‑ 65—289

DONALL H. SYLVESTER, *Primary Examiner.*

S. LEON BASHORE, A. D. KELLOGG,

*Assistant Examiners.*